May 12, 1964  O. SCHWENDT ETAL  3,132,398
SLIDE FASTENER
Original Filed April 8, 1959
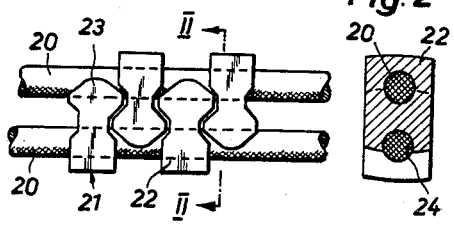
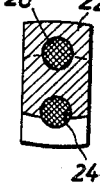
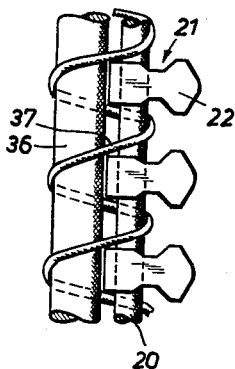
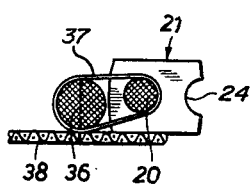
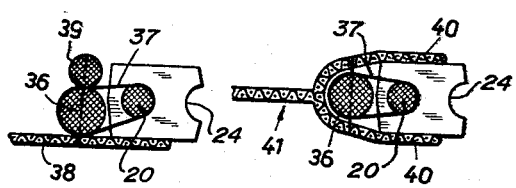
INVENTORS:
Otto Schwendt
Julius Meimberg
by Emery, Booth, Miller & Townsend
ATTORNEYS

United States Patent Office

3,132,398
Patented May 12, 1964

3,132,398
SLIDE FASTENER
Otto Schwendt, Barmen, and Julius Meimberg, Munster, Germany, assignors to Ri-Ri Werke A.G., Mendrisio, Switzerland
Original application Apr. 8, 1959, Ser. No. 805,061, now Patent No. 3,047,922, dated Aug. 7, 1962. Divided and this application May 23, 1962, Ser. No. 197,118
Claims priority, application Germany Apr. 12, 1958
3 Claims. (Cl. 24—205.16)

The present invention relates to slide fasteners in which longitudinal supports associated with the respective series of individual fastener elements properly maintain the latter in the required spaced relationship. It aims to provide such slide fastener which is inexpensively manufacturable in relatively small dimension, yet which may take over high loads and which does not lose any of its reliability even after a long use.

The present application is a division of our copending application Serial No. 805,061, filed April 8, 1959, now Patent No. 3,047,922, said parent application and this application as a division thereof claiming priority entitlement from application in Germany No. R 23113, filed April 12, 1958.

As in said parent application each slide fastener as a whole comprises at each side thereof a longitudinally extending supporting cord which is annularly enclosed by the base portions of the fastener elements mounted thereon. These supporting cords, when the fastener is closed, lie with the zones thereof which extend between adjacent base portions of the fastener elements of the one cord received in longitudinal recesses provided in the front ends of the heads of the fastener elements of the other cord so as to provide a transverse locking for the engagement of the fastener elements. Such construction and arrangement of fastener elements and supporting cords for the fasteners permits the realization of a small thickness for the fastener elements, as the base portions of the latter need not resist bending loads as is the case in the well-known fastener elements rigidly clamped onto their supports. Also the heads of the fastener elements as here concerned need not have such intricate shapes required in prior constructions, in order to provide for a secure transverse locking since, in this respect, our fasteners make use of the stated overengagement at the inter-element portions of one support by the longitudinally slotted front ends of the heads of the fastener elements of the opposite support.

Also as in said parent application the fastener elements may be secured to the respective supporting cords in various manners. For example, the fastener elements may be made of a synthetic material or of a metallic die-casting alloy and may be directly molded on the supporting rope or cord. The manufacture in this manner is rapid and trouble-free as the fastener elements are of very simple shapes.

The invention thus provides a slide fastener which may be produced very cheaply, which is of small dimensions, which effectively resists high loads and which has a long duration of useful life.

In accordance with the present invention the securing of the supporting cords bearing the fastener elements to the corresponding stringer tape, band or fabric strip is effected by associating with the supporting cord that is annularly enclosed by the base portions of the fastener elements a securing cord extending parallelly thereto and at the outside of the base portions of the fastener elements. The associative connection of said two cords may be effected in various manners. In some instances both cords may be manufactured simultaneously, with zones of connection lying between adjacent base portions of the fastener elements. Generally, however, it will be preferred to manufacture the cords separately and to interconnect them after the mounting of the fastener elements. To this end the cords may be operatively associated by a twisted or twined interconnection shown as a thread guided along a helical line.

Such securing cord is secured to the supporting fabric, such as a stringer tape preferably by sewing. Such connections are easily and reliably obtained with standard sewing machines. Thereby it is possible to place the securing cord with respect to the rim of the stringer in such manner that when the fastener is closed the rows of fastener elements are not visible, i.e. are covered. Moreover, when sewing on the securing cord it is possible as herein disclosed to place at least on one side a covering cord on it, which may also serve as guide track for the slide. This imparts to the fastener a particularly good appearance. Moreover such covering cords may sometimes help in supporting the fastener elements, such supporting preventing lateral escapement of the heads of the elements which could impair the closing of the fastener. Also the securing cord could be sewn between the flaps of a stringer of Y-shaped cross-section so as to hide the rows of fastener elements from both sides. Thereby in a simple manner a particularly reliable securing of the supporting cord provided with the fastener elements is obtained. Further, with the novelly combined fastener construction as here concerned the fastener elements are enabled to serve directly as guide track for the slide. Thereby the mechanical loads or strains to which the strip or band portions of the fastener are subjected remain small and the danger of clamping and the like is effectively prevented.

Other features and advantages of the invention will become apparent from the description now to follow of preferred embodiments thereof, given by way of example only, and in which reference will be made to the accompanying drawings. In these drawings:

FIG. 1 is a top view to show separately from the securing means a pair of supporting cords of a slide fastener with their fastener elements interengaged;

FIG. 2 is a section taken along the line II—II of FIG. 1;

FIG. 3 is a plan view of one fastener portion such as those of FIGS. 1 and 2 but with a securing cord attached;

FIG. 4 is a section through a fastener like that of FIG. 3 and with a fabric strip or stringer tape also attached;

FIG. 5 is a similar sectional view of a modification; and

FIG. 6 shows in similar section another embodiment of the invention.

The principle of the slide fastener as concerned in the present invention may be best seen in FIGS. 1 and 2. A supporting cord 20 extends along each side of the fastener and the cords 20 carry the fastener elements 21 arranged in the required spaced relationship thereon and preferably directly molded onto the cords. As shown in FIG. 2 the base portions 22 of the fastener elements annularly surround or enclose the corresponding cord 20.

This permits the base portions of the fastener elements to be made very small and in spite thereof to take up high loads. The heads 23 of the fastener elements are larger and provided at their front faces with longitudinally extending grooves or slots 24; see also FIGS. 4 to 6. When the fastener is closed the grooves 24 receive the cords 20 of the opposite row of fastener elements, so that a rigid and secure transverse locking is obtained. Moreover the widened head portions 23 of the fastener elements engage each other in a well-known manner and form a lock taking up tensile strains. The base portions 22 of the fastener elements could be made substantially narrower than shown in the illustrated embodiments.

And as is visible from the drawing, the illustrated structure permits particularly small dimensioning as on the one hand the heads of the fastener elements are of a simple shape and as on the other hand the base portions of the fastener elements are very compact.

In FIGS. 3 and 4 the supporting cord 20 bearing the fastener elements 21 is associated with a securing cord 36 paralleling the supporting cord 20 and extending along and outside of the base portions of the fastener elements. As illustrated this cord 36 has twined or twisted connection to the cord 20 by a spirally wrapped thread 37. As shown in FIG. 4 such a band of fastener elements is secured to the stringer 38 by sewing the cord 36 thereto.

A modified embodiment of the invention is shown in FIG. 5. In the latter the securing cord 36 is provided with a covering cord 39 which is sewn to the fabric 38 simultaneously with the cord 36.

In the further embodiment of FIG. 6 the securing cord 36 is sewn between flaps 40 of a stringer 41 having a Y-shaped cross-section, whereby the flaps 40 cover and hide the fastener elements on both sides. A covering of one side only may be obtained according to FIG. 4 by sewing the cord 36 at a corresponding distance from the rim of the stringer 38.

The represented embodiments are to be taken as examples for the realization of the invention. It is to be understood that the latter is not limited to such examples and that there are numerous other realizations possible. The outlines of the fastener elements may be varied and the fastener elements may be molded from synthetic material or may be produced from die-casting alloys, whereby in all the cases the simple shape of the fastener element permits a high-rate production. The use of covering cords or the like or of covering flaps as may be provided aids to support the fastener elements and to prevent lateral escape thereof. The slider may run either on guide faces of the fastener elements, or on tracks formed by threads at the rear of the fastener elements.

Consequently, while we have shown and described what are now thought to be the preferred forms of the invention, it is to be understood that the same is susceptible of other forms and expressions. Consequently we do not limit ourselves to the precise structures shown and described hereinabove, except as hereinafter claimed.

We claim:
1. A slide fastener comprising a pair of supporting cords, one of said cords extending along one side of the fastener and another cord extending along the opposite fastener side, fastener elements directly formed in spaced relationship on said cords, said elements each having a base portion annularly enclosing the cord to which it is associated and a T-shaped head portion having its front face slotted in longitudinal direction with respect to the fastener, the said slots receiving, when the fastener is closed, portions of the opposite supporting cord between adjacent fastener elements on said cord so as to provide a lateral locking of the engagement of the fastener elements, said T-shaped head portions of said fastener elements having interengaging planar side surfaces which by themselves alone enable relative movement of said elements normal to the plane of the fastener and which potential relative movement is limited by said slotted front face lateral locking for said elements, each said fastener side having a securing cord extending parallelly along the supporting cord thereof and adjacent to the base portions of the fastener elements borne by said supporting cord, means cooperably associating the securing cord and the supporting cord of the corresponding fastener side, said means comprising a helically guided thread passed jointly about said cords and between the base portions of adjacent fastener elements, each said fastener side further having a stringer paralleling said supporting and securing cords thereof with the stringer rim in lapped relation thereto and to the fastener elements, and sewn stitches affixing the securing cords to the respective stringers in said relation.

2. A slide fastener according to claim 1 including a covering cord laid along and against the securing cord of at least one fastener side and affixed thereto and to the stringer by the same sewn stitches which affix the securing cord to said stringer.

3. A slide fastener according to claim 1 wherein a stringer has along the longitudinal portion thereof adjacent the fastener elements a Y-shaped cross-section defining flaps and the corresponding securing cord is located between and near the juncture of said flaps.

References Cited in the file of this patent

UNITED STATES PATENTS

| | | |
|---|---|---|
| 1,776,847 | Blair | Sept. 30, 1930 |
| 1,837,011 | Blair | Dec. 15, 1931 |
| 2,174,159 | Marinsky | Sept. 26, 1939 |
| 2,586,891 | Wahl | Feb. 26, 1952 |
| 2,858,592 | Schwartz | Nov. 4, 1958 |
| 2,867,879 | Urban | Jan. 13, 1959 |
| 3,057,031 | Wahl | Oct. 9, 1962 |

FOREIGN PATENTS

| | | |
|---|---|---|
| 15,286 | Australia | Feb. 25, 1904 |
| 221,913 | Switzerland | Sept. 16, 1942 |